US012794572B2

(12) United States Patent
Caporal del Barrio et al.

(10) Patent No.: US 12,794,572 B2
(45) Date of Patent: Nov. 10, 2026

(54) UL GAP ELIGIBILITY

(71) Applicant: Nokia Technologies Oy, Espoo (FI)

(72) Inventors: Samantha Caporal del Barrio, Aalborg (DK); Benny Vejlgaard, Aalborg (DK); Simon Svendsen, Aalborg (DK); Petri Juhani Vasenkari, Espoo (FI); Sari Kaarina Nielsen, Espoo (FI); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 277 days.

(21) Appl. No.: 18/695,802

(22) PCT Filed: Oct. 22, 2021

(86) PCT No.: PCT/EP2021/079386

§ 371 (c)(1),
(2) Date: Mar. 26, 2024

(87) PCT Pub. No.: WO2024/066504

PCT Pub. Date: Apr. 27, 2024

(65) Prior Publication Data

US 2025/0088288 A1 Mar. 13, 2025

(51) Int. Cl.
*H04B 17/10* (2015.01)
*H04W 52/36* (2009.01)

(52) U.S. Cl.
CPC ........ *H04B 17/102* (2015.01); *H04W 52/365* (2013.01); *H04W 52/367* (2013.01)

(58) Field of Classification Search
CPC . H04B 17/102; H04W 52/365; H04W 52/367
See application file for complete search history.

(56) References Cited

U.S. PATENT DOCUMENTS 11,528,046 B2 12/2022 Caporal Del Barrio et al.
2019/0222326 A1 7/2019 Dunworth et al.
(Continued)

OTHER PUBLICATIONS

"Email Discussion Summary for [100-e][130] NR_RF_FT2_req_enh2_Part_2", 3GPP TSG-RAN WG4 meeting # 100-e, R4-2114730, Agenda: 9.4.3, 9.4.6.3, Apple, Aug. 16-27, 2021, 34 pages.) (Year: 2021).*
(Continued)

*Primary Examiner* — Angelica Perez
(74) *Attorney, Agent, or Firm* — Brake Hughes Bellermann LLP

(57) ABSTRACT

Inter-alia, a method is disclosed comprising: while a user equipment, UE, is scheduled without uplink, UL, gap intervals for proximity sensing: performing a first measurement indicative of a first measured peak effective isotropic radiated power, EIRP, value of the UE, and obtaining a first UL transmit power report from the UE; while the UE is scheduled with one or more UL gap intervals for proximity sensing and is placed in a free-space environment: outside the one or more scheduled UL gap intervals, performing a second measurement indicative of a second measured peak EIRP value of the UE, and obtaining a second UL transmit power report from the UE; and determining whether the UE is eligible for UL gap configuration at least based on the first and second measured peak EIRP values and on the first and second UL transmit power reports. It is further disclosed an according apparatus, computer program and a testing arrangement.

20 Claims, 3 Drawing Sheets

(56) References Cited

U.S. PATENT DOCUMENTS

| | | | | |
|---|---|---|---|---|
| 2022/0182961 | A1* | 6/2022 | Dai | H04W 56/0045 |
| 2024/0015708 | A1* | 1/2024 | Oguma | H04W 8/24 |
| 2024/0107464 | A1* | 3/2024 | Niu | H04W 52/367 |
| 2024/0244533 | A1* | 7/2024 | Niu | H04W 8/24 |
| 2025/0126569 | A1* | 4/2025 | Kazmi | H04W 52/44 |

OTHER PUBLICATIONS

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.2.0, Jun. 2021 pp. 1-186.

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

"3rd Generation Partnership Project; Technical Specification Group Radio Access Network; NR; Requirements for support of radio resource management (Release 17)", 3GPP TS 38.133, V17.2.0, Jun. 2021, 3177 pages.

"Revised WID Further enhancements of NR RF requirements for frequency range 2 (FR2)", 3GPP TSG RAN meeting #92e, RP-211538, Agenda: 9.7.4.8, Nokia, Jun. 14-18, 2021, 6 pages.

"UL gaps for Tx power management", 3GPP TSG-RAN WG4 Meeting #100-e, R4-2112088, Agenda: 9.4.3.2, Apple, Aug. 16-27, 2021, pp. 1-7.

"Requirements and test cases of UE FR2 UL GAP for UE Tx power enhancement", 3GPP TSG-RAN WG4#100-e Meeting, R4-2112808, Agenda: 9.4.3.2, Nokia, Aug. 16-27, 2021, 5 pages.

"Msc-generator", Sourceforge, Retrieved on Apr. 1, 2024, Webpage available at :https://sourceforge.net/projects/msc-generator/.

"3rd Generation Partnership Project; Technical Specification Group Radio Access Network; General aspects for User Equipment (UE) Radio Frequency (RF) for NR (Release 16)", 3GPP TR 38.817-01, V16.2.0, Sep. 2020, pp. 1-102.

International Search Report and Written Opinion received for corresponding Patent Cooperation Treaty Application No. PCT/EP2021/079386, dated Jun. 30, 2022, 14 pages.

"Email discussion summary for [100-e][130] NR_RF_FR2_req_enh2_Part_2", 3GPP TSG-RAN WG4 Meeting # 100-e, R4-2114730, Agenda: 9.4.3, 9.4.6.3, Apple, Aug. 16-27, 2021, 34 pages.

"WF on FR2 enhancement part 2: UL gaps", 3GPP TSG-RAN WG4 Meeting #100-e, R4-2114964, Agenda: 9.4.3 and 9.4.6.3, Apple, Aug. 16-27, 2021, 3 pages.

"Network impact of UE FR2 UL Gap for UE Tx power enhancements", 3GPP TSG-RAN WG4 Meeting#100e, R4-2114016, Agenda: 9.4.6.3, Nokia, Aug. 16-27, 2021, 4 pages.

* cited by examiner

UL GAP ELIGIBILITY

BACKGROUND

Governmental exposure guidelines are in place to prevent health issues due to thermal effects. This also relates to user equipments, UEs, used in mobile communication networks. The so-called Maximum Permissible Exposure (MPE) is the regulation on power density for the mmWave regime and Federal Communications Commission (FCC) sets the threshold for MPE at 10 $W/m^2$ (1 $mW/cm^2$). For a certain distance separating the human tissue from the antenna, a UE Tx Power Back-Off (PBO) is required for FCC compliance with MPE.

RELATED APPLICATION

This application was originally filed as PCT Application No. PCT/EP2021/079386 on Oct. 22, 2021, which is incorporated herein by reference in its entirety.

FIELD

The following disclosure relates to the field of Maximum Permissible Exposure (MPE) and associated transmit power backoff in mobile communication networks.

When a user is nearly touching the antenna, the maximum allowed Effective Isotropic Radiated Power (EIRP) for MPE compliance can be as low as only 10 dBm for 100% uplink (UL) duty cycle, which is so low that the UE Tx power may need to be backed-off by more than 20 dB. The PBO throttles transmit power of UEs which are in power limitation or close to it (e.g. cell edge UEs, non-line of sight (NLOS) scenarios, etc.), and thereby reduces the power received by the gNB and consequently the uplink signal-to-interference-plus-noise ratio (SINR) as well, potentially causing UL failures.

3GPP standardization agreed to MPE power management-Maximum Power Reduction (P-MPR) reporting to mitigate UL degradation due to MPE events. The MPE reports consists of re-using P- and R-bits of the Power Headroom Report (PHR) when an MPE event is triggered at the UE by:

setting the P-bit to 1; and/or

P-MPR indication with two R-bits of the PHR.

In order to detect MPR on a UE, the UE must be able to become aware of e.g. body proximity, and hence, this means that some UEs must be equipped with proximity sensors, e.g. infra-red sensors, capacitive sensors, radar technology, etc. The best choice for proximity sensing in current UE implementations appears to be to embed a radar functionality on the mmW arrays, in order to optimize space and design, as well as to reduce cost and complexity of the front-end.

Nonetheless, in order to perform the radar measurement with mmW array elements in a regular way, the UE must have the respective occasions regularly which will interrupt its UL transmission. As such 3GPP standardization proposes to investigate UL gap intervals in frequency range 2 (FR2) for this purpose.

SUMMARY OF SOME EXEMPLARY EMBODIMENTS

However, using P-MPR metric or EIRP metric may not be suitable since e.g. a P-MPR test cannot prove that a UE transmit (Tx) power enhancement is a direct result from a radar measurement during the UL gap intervals. Furthermore, such test could be easily cheated by UE vendors to perform other types of calibration during such UL gap intervals which may be used to relax other requirements and lead to degraded performance. Peak EIRP measurement requires phantom/material blocking and alone cannot verify that a P-MPR value that is reported is accurate so that the UL gap scheduling cannot be linked to the actual radar activation of the UE.

It is thus, inter alia, an object to achieve a solution that enables using UL gap intervals for (e.g. body) proximity sensing in order to ensure that the performance gains are obtained from such an introduction of UL gap intervals for proximity sensing. Further, the principles of the solution should also be applyable when implemented in a network.

According to a first-exemplary aspect, a method is disclosed, the method comprising:

- while a user equipment, UE, is scheduled without uplink, UL, gap intervals [e.g. periods] for proximity sensing:
  - performing a first measurement indicative of a first measured peak effective isotropic radiated power, EIRP, value of the UE, and
  - obtaining a first UL transmit power report from the UE;
- while the UE is scheduled with one or more UL gap intervals for proximity sensing and is placed in a free-space environment:
  - outside the one or more scheduled UL gap intervals, performing a second measurement indicative of a second measured peak EIRP value of the UE, and
  - obtaining a second UL transmit power report from the UE; and
- determining whether the UE is eligible for UL gap configuration at least based on the first and second measured peak EIRP values and on the first and second UL transmit power reports.

According to a second exemplary aspect, a testing arrangement is disclosed, wherein the testing arrangement comprises means for performing and/or controlling the method according to the first exemplary aspect. Such a testing arrangement may comprise one or more UEs, one or more network analyzers or network sniffers, one or more test equipment, one or more measurement equipment, one or more network entities or network emulators, or a combination thereof. Such a testing arrangement may automate at least the method according to the first exemplary aspect. Such a testing arrangement may comprise a single entity, or a plurality (e.g. at least two) of entities, in which case the means may be comprised by or are a part of one or more respective entities of the plurality of entities. In case that the testing arrangement comprises a single entity, the testing arrangement may be represented by an apparatus that is configured to perform and/or control or comprises the means for performing and/or controlling the method according to the first exemplary aspect.

The means of the testing arrangement can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors According to a further exemplary aspect, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

In the following, exemplary features and exemplary embodiments of all aspects will be described in further detail.

The first measurement may be performed to gather (e.g. measure) a first measured peak EIRP value (or equivalently a peak received power density value). Accordingly, the second measurement may be performed to gather (e.g. measure) a second measured peak EIRP value (or equivalently a peak received power density value). The performing of the first and second measurement may be done by the testing arrangement, in particular by one or more entities comprised by the testing arrangement.

The first measurement is performed based on the respective UE being scheduled without UL gap intervals (also referred to as "gaps" or "gap periods"). The respective peak EIRP value may be referred to as a value 'P_NoGap'. The second measurement is performed based on the respective UE being scheduled with one or more UL gap intervals and outside a respective UL gap interval of the one or more UL gap intervals. The respective peak EIRP value may be referred to as a value 'P_AfterGaps'.

To be scheduled without any UL gap intervals, or with one or more UL gap intervals, the respective UE may be configured to be scheduled without any UL gap intervals, and/or with one or more UL gap intervals. Then, the UL gap configuration may be de-activated for the UE to be scheduled without any UL gap intervals, and/or may be activated for the UE to be scheduled with one or more UL gap intervals UL gap intervals may for instance be configured by means of a certain duration of a respective UL gap interval, and a periodicity according to which such UL gap intervals occur, thereby defining a certain UL gap pattern.

The first measurement is performed, and the first UL transmit power report is obtained while the respective UE is scheduled without any UL gap intervals. The second measurement is performed and the second UL transmit power report is obtained while the respective UE is scheduled with one or more UL gap intervals.

UL gap intervals can be used for proximity sensing, also referred to as proximity detection or proximity measurements. Such a proximity sensing may be performed and/or controlled for sensing whether a part of a human body of a user of the respective UE is near or touches the respective UE or not.

From a chronological point of view the first measurement is performed, and the first UL transmit power report is obtained before the second measurement is performed and the second UL transmit power report is obtained, or vice versa the first measurement is performed, and the first UL transmit power report is obtained after the second measurement is performed and the second UL transmit power report is obtained. Thus, within the meaning of the present subject-matter, also the second measurement may be performed and the second UL transmit power report may be obtained and/or controlled prior to the first measurement is performed and the first UL transmit power report is obtained.

A respective peak EIRP value of the first measurement and/or of the second measurement, as used herein, may be understood or defined as a/the maximum value of a total power radiated by a fictious isotropic antenna having, as uniform power density, the maximum power density achievable over a main lobe of an antenna array comprised by the respective UE. A respective first and second measurement indicative of a respective first and/or second EIRP value are typically performed by means of an external horn antenna moving around the respective UE under test and, for a given azimuth and elevation angle, and at a given distance from the antenna array, e.g. capturing a certain received power under a given aperture area, and from which a transmit power density in the given direction can be derived, and from which a certain EIRP value can be further derived.

Performing of an EIRP measurement may be an antenna measurement providing the measured radiated power in a single direction (that is, for fixed azimuth and elevation angles). The peak EIRP value is understood to be the maximum value. Thus, such a peak EIRP value may represent the maximum amount of power that an isotropic antenna would need to radiate in order to reach that value.

The second peak EIRP value may be gathered (e.g. measured) after a respective gap interval of the one or more gap intervals, e.g. it is gathered directly after a respective gap, and/or when the respective UE performs UL transmission(s) since then, no UL gap interval is currently applied.

The first UL transmit power report is obtained, e.g. by receiving the first UL transmit power report. The first UL transmit power report may for instance be received from the respective UE, or from another apparatus or entity to which the first UL transmit power report is sent by the respective UE. Additionally or alternatively, the first UL transmit power report may be received via an entity that is different from the respective UE providing (e.g. sending) the first UL transmit power report and also different from the other apparatus or entity obtaining (e.g. receiving) the first UL transmit power report.

A respective UL transmit power report, as used herein, is understood as the respective UE indicating an applied transmit power backoff value, e.g. as belonging to a certain range. Such a respective UL transmit power report may be a P-MPR report. A respective P-MPR report may comprise a/the current maximum transmit power and a/the current transmit power backoff currently used by the respective UE. A respective P-MPR report may be part of a Power Headroom (PHR) report. The respective UL transmit power report may comprise one or more levels indicative of one or more reported values.

According to an exemplary embodiment of the first exemplary aspect, the first and second UL transmit power reports comprise first and second UL transmit power reduction values respectively. The first UL transmit power reduction value may be referred to as a value 'P-MPR_NoGap'. The second UL transmit power reduction value may be referred to as a value 'P-MPR_AfterGaps'. The respective first UL transmit power reduction value and/or the respective second UL transmit power reduction value may be associated with a certain range. For instance, in case of being represented by two bits, four power reduction levels as reported values may be represented, e.g. P-MPR_00, P-MPR_01, P-MPR_02 and P-MPR_03. A respective level then may represent e.g. a value of either 0 dB or a certain range. For instance, in the given example, the following mapping may be used:

| Reported value | Measured quantity value | Unit |
|---|---|---|
| P-MPR_00 | 3 ≤ PMP-R ≤ 6 | dB |
| P-MPR_01 | 6 ≤ PMP-R ≤ 9 | dB |
| P-MPR_02 | 9 ≤ PMP-R ≤ 12 | dB |
| P-MPR_03 | PMP-R ≥ 12 | dB |

The second UL transmit power report is obtained, e.g. by receiving the second UL transmit power report. The second UL transmit power report may for instance be received from the UE, or from another apparatus or entity to which the second UL transmit power report is sent by the respective UE. Additionally or alternatively, the second UL transmit power report may be received via an entity that is different from the UE providing (e.g. sending) the second UL transmit power report and also different from the other apparatus or entity obtaining (e.g. receiving) the second UL transmit power report.

The second measurement is performed and the second UL transmit power report is obtained while the respective UE is scheduled with one or more UL gap intervals and the respective UE is placed in a free-space environment. Such a free-space environment, as used herein, is understood to mean that no blocking, obstacle, material or a combination thereof is located within a surrounding of the respective UE. The blocking, obstacle, material or a combination thereof is in particular not present e.g. within a given distance and in a direction of the propagation of one or more radio signals e.g. that are sent/received by the respective UE. In particular, no body of a user of the respective UE is in a vicinity of the respective UE so that no power reduction occurs due to a proximity between the respective UE and the user of the respective UE. Such a vicinity of the respective UE may be understood in particular that the body of a user of the UE is not blocking a path of communication and/or triggering a radar sensor embedded in the antenna array, and/or blocking an area of a sphere where the transmitted power of the UE is above a certain threshold. For instance, if the peak EIPR value is approx. 34 dBm, this may equal to approx. a distance of 14 cm of free-space environment surrounding the respective UE. To be compliant with FCC requirements, at this distance the UE may need to reduce its output power. Further, this can be calculated from power density formula, where FCC requires to be below 1 mW/cm2. Such a surrounding of the respective UE may in particular be understood as the surrounding in the main direction of propagation (e.g. main lobe) of the antenna array of the UE.

Further, the second measurement is performed outside the one or more scheduled UL gap intervals, thus, e.g. when the respective UE performs its regular UL transmissions.

The determining whether the UE is eligible for UL gap configuration at least based (or in the alternative, solely based) on the first and second measured peak EIRP values and on the first and second UL transmit power reports may represent a test procedure to check the respective UE. Such a test procedure may be a compliance test. Such a test procedure may relate to Maximum Permissible Exposure (MPE) and associated transmit power backoff for a respective UE in a mobile communication network. Such a test procedure may be performed and/or controlled for a plurality of UEs. The testing arrangement may automate such a test procedure. The determining may allow to check whether the UE shows enough transmit power improvements when it is scheduled with UL gap intervals for UL transmission(s). Further, it may be determined (e.g. verified) whether the UE is actively using the one or more gap intervals e.g. for proximity measurements e.g. by a radar antenna array comprised by the UE (and e.g. not for power amplification (PA) or beam calibration, or any other purpose the one or more gap intervals in UL transmissions are not intended for).

The method according to the first exemplary aspect may not use any phantom or blocking material. The method according to the first exemplary aspect may be based on e.g. both UL transmit power report(s) and peak EIRP measurement(s).

The method according to the first exemplary aspect is performed with and without any UL gap intervals configured on the respective UE. Such UL gap intervals may be configured to allow the respective UE to e.g. suspend regular UL transmissions and re-use its antenna array for performing in-band or out-of-band proximity sensing (in the so-called radar mode).

This may also allow that for Radio Frequency (RF) aspects of mobile communication networks (e.g. UTRAN/E-UTRAN/NR), minimum requirements for transmission and reception parameters, Radio Resource Management (RRM), and for channel demodulation and Channel State Information (CSI) reporting may be derived. Further, this may allow to define a test procedure that may be used to verify such minimum requirements for the UE, as disclosed above.

According to an exemplary embodiment of the first exemplary aspect, the first and second UL transmit power reports comprise first and second current maximum UL transmit power values (e.g. quantized 'Pc,max' values) respectively. Such a quantized 'Pc,max' value may be an absolute power value. Such a 'Pc,max' value may represent a current allowable UE maximum transmit power (including any transmit power backoff if any), and could be used as an alternative to the transmit power reduction or P-MPR value. The value 'Pc,max' may represent a current allowable UE maximum transmit power e.g. including any applied transmit power backoff if any. The value 'Pc,max' may be used as an alternative to the P-MPR report representing e.g. a range of values (e.g. as comprised by the first and/or second UL transmit power report), provided that the respective UE provides (e.g. transmits) the second UL transmit power report at nominal maximum transmit power in a free-space environment (e.g., 23 dBm), and that no further transmit power backoff in addition to the MPE-related one (for instance because of overheating issue) is applied.

According to an exemplary embodiment of the first exemplary aspect, the method further comprises:

- verifying that the first measured peak EIRP value is equal to or larger than a first threshold value;
- verifying that a difference between the first and second measured peak EIRP values is consistent with a difference between the first and second UL transmit power reduction values; and
- verifying that a difference between the first and second UL transmit power reduction values is equal to or larger than a second threshold value.

In this example embodiment, the first and second UL transmit power reports comprise first and second UL transmit power reduction values.

The verifying that a difference between the first and second measured peak EIRP values is consistent with a difference between the first and second UL transmit power reduction values may be understood that it is within a (e.g. consistent) level of the values represented by the UL transmit power report, e.g. the difference between the first and second measured peak EIRP values may be in a same value, such as value 'P_MPR_00' representing a range of values between 3 dB to 6 dB, for instance. For instance, we may verify that a difference between the first and second measured peak EIRP values is equal to or larger than a difference between the first and second UL transmit power reduction values.

According to an exemplary embodiment of the first exemplary aspect, the method further comprises:

verifying that the first measured peak EIRP value is equal to or larger than a first threshold value;

verifying that a difference between the first and second measured peak EIRP values is consistent with a difference between the first and second UL transmit power reduction values; and verifying that a difference between the first and second measured peak EIRP values is equal to or larger than a second threshold value.

In this example embodiment, the first and second UL transmit power reports comprise first and second UL transmit power reduction values.

For the verifying that the first measured peak EIRP value is equal to or larger than a first threshold value, since the UE is unable to perform and/or control proximity sensing as there are no gap intervals scheduled for its UL transmissions, the UE is expected to apply some default transmit power backoff corresponding to some default transmit power peak EIRP value. By this verifying, it may be verified (e.g. ensured) that such a (e.g. default) peak EIPR value, as represented by the first measurement, corresponds or fulfills at least requirements that correspond to a worst-case scenario e.g. when a user touches the respective UE or is very close (e.g. within a few mm) to the UE, i.e., the user's body or face may touch the UE and/or is a few mm away from the antenna array comprised by or connectable to the UE. Therefore, it may be compared against the first threshold value.

By the verifying that a difference between the first and second measured peak EIRP values is consistent with a difference between the first and second UL transmit power reduction values, it may be verified (e.g. ensured) that the first and second UL transmit power reports that are e.g. generated by the UE and obtained, can be considered to be reliable and consistent with the first and second measurement indicative of the first and second measured peak EIRP values.

By the verifying that a difference between the first and second UL transmit power reduction values is equal to or larger than a second threshold value, or that a difference between the first and second measured peak EIRP values is equal to or larger than a second threshold value, it may be verified (e.g. ensured) that the UE meets expected transmit power improvements (e.g. 5 or 6 dB improvement can be targeted). More specifically, it may be verified by such a verifying whether the difference between the values 'P_AfterGaps−P_NoGap' is equal to or above a second threshold, or that the difference between the values 'P-MPR_AfterGaps−P-MPR_NoGap' is equal to or above a second threshold.

According to an exemplary embodiment of the first exemplary aspect, the UE is considered eligible for UL gap configuration in case the verifying step(s) described above are passed.

For instance, after the verifying as disclosed above is performed and/or controlled e.g. by the testing arrangement and yields a positive result, the respective UE can be considered eligible for UL gap configuration. It can be confirmed that e.g. the respective UE shows enough P-MPR improvement so that the UE can be granted to be scheduled with one or more UL gap intervals.

According to an exemplary embodiment of the first exemplary aspect, the method further comprises:

verifying that the first measured peak EIRP value is equal to or larger than a first threshold value;

verifying that a difference between the first and second measured peak EIRP values is consistent with a difference between the first and second current maximum UL transmit power values; and verifying that a difference between the first and second current maximum UL transmit power values is equal to or larger than a second threshold value.

In this example embodiment, the first and second UL transmit power reports comprise first and second current maximum UL transmit power values (e.g. quantized Pc,max values) respectively.

According to an exemplary embodiment of the first exemplary aspect, the method further comprises:

verifying that the first measured peak EIRP value is equal to or larger than a first threshold value;

verifying that a difference between the first and second measured peak EIRP values is consistent with a difference between the first and second current maximum UL transmit power values; and verifying that a difference between the first and second measured peak EIRP values is equal to or larger than a second threshold value.

In this example embodiment, the first and second UL transmit power reports comprise first and second current maximum UL transmit power values (e.g. quantized Pc,max values) respectively.

In difference to the first two example embodiments comprising the verifying steps, the first and second UL transmit power reports comprise first and second current maximum UL transmit power values as absolute values (e.g. 'Pc,max' values), and not values representing a certain range, e.g. one of the values 'P-MPR_00', 'P-MPR_01', 'P-MPR_02', or 'P-MPR_03', as disclosed above, to name but a few non-limiting examples. Utilizing such absolute current maximum UL transmit power values may change slightly how the verifying is performed and/or controlled.

The verifying steps of the example embodiments of the first exemplary aspect, as disclosed above in the example embodiments, can be performed and/or controlled in any order, e.g. a random order.

According to an exemplary embodiment of the first exemplary aspect, the first threshold value is specific to a particular antenna array type used by the UE.

For instance, the first threshold value may correspond to an MPE limit minus some margin. Such a margin may be 1, 2, or 3 dB. The second threshold value may correspond to e.g. 5 or 6 dB. This may represent, thus, 5 or 6 dB MPE improvement. The second threshold, e.g. 5 or 6 dB, may be set to target such a transmit power improvement that is achievable by the UE, and to consider the UE to be eligible to be configured with one or more UL gap intervals in UL transmissions. Also it may further be checked/verified by the verifying whether the default peak EIRP value is not artificially low. Indeed, the UE may cheat and apply a too strong default transmit power backoff when no UL gap intervals for UL transmissions are configured. In this way, the UE can show the expected 5 or 6 dB improvement as required by the second threshold when it is configured with one or more UL gap intervals for UL transmissions.

According to an exemplary embodiment of the first exemplary aspect, the first threshold value is determined from near-field simulations for the particular antenna array type. For the respective verifying, e.g. a so-called 'P_NoGap' value may be compared versus some FCC figures in terms of maximum peak EIRP value allowed for this UE model to comply with the MPE limit, or versus some figures derived from a respective simulation, e.g. that is based on a visual inspection of the antenna array (e.g., 2×2 vs 1×4 vs 1×8 antenna array) and corresponding near-field simulations for this type of antenna array, or versus some figures as agreed in standardization, to name but a few non-limiting examples.

According to an exemplary embodiment of the first exemplary aspect, the first threshold value is determined from near-field measurements.

According to an exemplary embodiment of the first exemplary aspect, the method further comprises: while the UE is scheduled with the one or more UL gap intervals for proximity sensing and is placed in the free-space environment:

during one or more UL gap intervals, performing a third measurement indicative of a third measured in-band peak EIRP value of the UE; and verifying that the third measured in-band peak EIRP value is smaller than or equal to a third threshold value.

The proximity sensing may for instance be performed around e.g. 60 GHZ, in particular outside a FR2 frequency band or out-of-band. The third measured in-band peak EIRP value may mean that the radiated power in the FR2 frequency band used for UL communication has been measured. Such an in-band measuring may be performed and/or controlled to verify that the respective UE is actually using the UL gap intervals for proximity sensing, e.g. in 60 GHz band. When the third measured in-band peak EIRP value exceeds the third threshold value, this may indicate that the respective UE is not using the UL gap intervals e.g. exclusively for proximity sensing. The measurement of the third measured in-band peak EIRP value may be performed during a respective UL gap interval of the one or more UL gap intervals (e.g. value 'P_InGaps'). This may allow to make sure that no PA calibration procedure or alike is taking place during the UL gap intervals. For instance, it may be checked/verified whether such a measured in-band peak EIRP value, e.g. 'P_InGaps', is below the third threshold value, e.g. 0 dBm. The third threshold value may be configurable. If this checking/verifying yields a positive result, it is confirmed that the scheduled UL gap intervals based on which the respective UE provided e.g. the second UL transmit power report are/were really used for proximity sensing and not for other invalid purposes.

For instance, in an example embodiment, the UE is performing proximity sensing at 60 GHz (out-of-band), and the testing arrangement is measuring EIRP at 28 GHZ (in-band). The testing arrangement verifies that there is no UE Tx power above a limit (e.g. emission mask requirements of a value configured by a network entity) during the UL gap interval at 28 GHz. If there was significant power from the UE at 28 GHz (in-band), then it could be derived that the UE is using the UL gap intervals to also make other types of internal calibrations e.g. as the mentioned PA and/or TRX calibrations, to name but one non-limiting example.

According to an exemplary embodiment of the first exemplary aspect, the method further comprises:

configuring the UE without any UL gap intervals scheduled for UL transmissions of the UE, wherein the UE activates the respective configuration without any UL gap intervals or de-activates the configuration with one or more UL gap intervals for performing the first measurement and for obtaining the first UL transmit power report.

According to an exemplary embodiment of the first exemplary aspect, the method further comprises after the first measurement report is obtained:

configuring the UE with one or more UL gap intervals scheduled for UL transmissions of the UE, wherein the UE activates the respective configuration with one or more UL gap intervals for performing the second measurement and for obtaining the second UL transmit power report.

The respective UE may be configured without any UL gap intervals to be scheduled for UL transmissions e.g. by signalling. Further, the respective UE may be configured with one or more UL gap intervals to be scheduled, e.g. by signalling. For instance, RRC signalling may be used to configure the respective UE without any UL gap intervals or with one or more UL gap intervals, or a configuration may be triggered, e.g. by an entity of the mobile communication network, so that e.g. information allowing the respective UE to be configured accordingly for its UL transmissions may be provided (e.g. sent) to the respective UE.

According to an exemplary embodiment of the first exemplary aspect, the first threshold value corresponds to a MPE limit minus a pre-defined or configured margin (e.g. 1 or 2 dB); wherein the second threshold value is between 5 to 6 dB; and wherein optionally the third threshold value is configured (e.g. 0 dBm).

For instance, for the antenna array design, the FCC limit for maximum allowed EIRP during an MPE event, may be around 20 dBm e.g. in 20% UL scheduling.

If the respective UE can transmit at 26 dBm EIRP (Hand-held UEs are Power Class 3 devices (PC3)), the respective UE may need to apply 6 dB P-MPR (=26 dBm-20 dBm).

As an example, as such, for UL gap intervals (e.g. scheduled with one or more gap intervals for UL transmissions of the respective UE) to be granted, absolute peak EIRP value without MPE events may be needed to be at least a threshold e.g. 26 dBm and P-MPR improvement needs to be at least e.g. 6 dB.

To show a relative improvement of 6 dB that is meaningful, the maximum Tx radiated power under MPE (i.e. 'P_NoGap') of the respective UE in near-field may be used. Additionally or alternatively, a minimum value e.g. at least 20 dBm with 20% UL duty cycle for a 1×4 array may be defined for such antenna arrays, to name but one non-limiting example. An example of values to be agreed to at least show as maximum allowed radiated power without gap intervals (i.e. FCC limit) in 20% UL duty cycle, the following values/parameters as shown in table 1 below may be considered, where peak EIRP allowed under MPE may differ depending on array design (i.e. 1×4 vs 1×8), from which the first threshold value can be derived (for instance, FCC limit minus a margin, e.g. 1 or 2 dB):

| Antenna Array Type | FCC limit: P NoGap> |
| --- | --- |
| 1 × 2 | 20 dBm |
| 1 × 4 | 20 dBm |
| 2 × 2 | 20 dBm |
| 1 × 8 | 23 dBm |

The UE may either be configured without gap intervals scheduled for its UL transmissions, or with one or more gap intervals scheduled for its UL transmissions. Also, the UE may be configured with both, thus, without gap intervals scheduled for its UL transmissions and with one or more gap intervals scheduled for its UL transmissions. This may be understood in that the UE does not apply both configurations simultaneously, but can switch between them on its own, to name but one non-limiting example for the "and/or" combination. This may be done by the respective UE activating the respective configuration.

The (e.g. final) configuring of the respective UE to be configured with one or more gap intervals for UL transmissions may depend on a result of the verifying.

The UE, for instance, may be a mobile terminal, for example a computing device, for example a mobile phone, a tablet, a laptop, or another type of mobile device, such as a vehicle for travelling in air, water, or on land, e.g. a plane or a drone, a ship or a car or a truck. It may also be a robot, a sensor device, a wearable device, an Internet of Things (IoT) device, a Machine Type Communication (TC) device, or the likes. The UE may in particular comprise communication means. The communication means may enable the UE to establish a radio communication link, in particular communication link to a cell. The communication means comprise for example an antenna, an antenna array, an amplifier, and isolator and/or other components that enable the emission and/or reception of electromagnetic waves and thereby enable the establishment of radio communication links.

Furthermore, example embodiments of all exemplary aspects may combine peak EIRP values (with, without, and/or during the gap intervals) and P-MPR measurements to verify one or more of the following:

- that even with P-MPR measurements as obtained from the respective UE of >12 dB, there may be respective UE Tx power improvement;
- whether the respective UE is performing in-band or out-of-band radar measurements;
- the power level of the radar measurement (i.e. the user may be within 14 cm therefore the radar power does not need to be very high),
  - which in turn can reveal if the UL gap is (e.g. only) used for MPE enhancements or other PA and TRX calibrations (where maximum PA power level may be used) are included in the reported gain. This may be very important to not hide further UE relaxations on performance into the UL gap intervals.
  - no artificial P-MPR gain is reported due the respective UE increasing the P-MPR to a larger value than actually needed with using for e.g. a RAN4 test procedure:
    - agreed absolute maximum peak EIRP value under MPE event e.g. depending on array design, or
    - agreed to use identical value than in FCC test as maximum peak EIRP value under MPE event; and
- in live network conditions, this may not be needed as UE will use maximum allowed peak EIRP in tough channel conditions.

According to an exemplary embodiment of the second exemplary aspect, a P-MPR improvement achievable by the respective UE being scheduled with one or more UL gap intervals depends on a design of an antenna array of the apparatus.

The proposed procedure may (e.g. only) schedule UL gap intervals for UEs that can show a gain of at least 6 dB when using radar measurements for user detection during the gap intervals. When no user is detected the UE is not under MPE event and can increase the Tx power. For the UE Tx power to reveal significant changes, the UE needs to be in power limited scenario. In test mode, it is possible to configure the UE for such operating condition.

It is noted that such a procedure is described for UL gap intervals of a respective se UE, though it could be applicable to other gap intervals as well, e.g. DL gap intervals in case the network would decide to schedule gap intervals for MPE in DL slots in order to reduce UL throughput degradation in DDDSU configuration.

The features and example embodiments described above may equally pertain to the different aspects.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding and shall be understood to complement and be read together with the description as provided in the above summary section of this specification.

Figure 1:
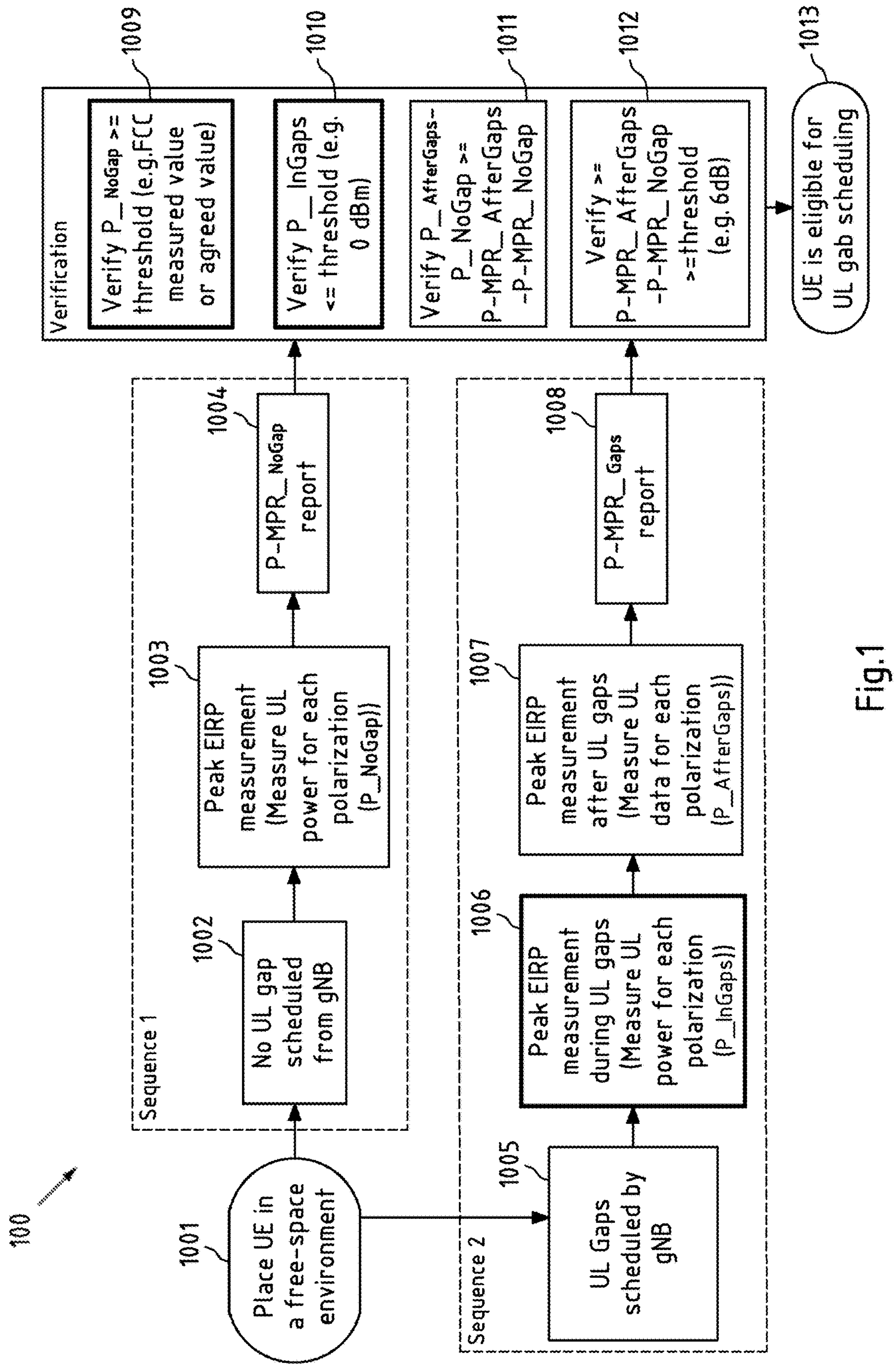
FIG. 1 a schematic block diagram of a testing arrangement according to the second exemplary aspect.

FIG. 1 is a schematic high-level block diagram showing an example embodiment of a testing arrangement 100 of the second exemplary aspect. The testing arrangement 100 may comprise a network entity or network emulator, e.g. typically a base station (e.g. eNB/gNB) or base station emulator, a measurement equipment, a network analyzer or network sniffer, and a user equipment, UE. Steps performed by the testing arrangement 100 are illustrated in FIG. 1 by the various steps 1002 to 1012 respectively surrounded by the schematic blocks 'Sequence 1', 'Sequence 2', and 'Verification'. These various entities and/or equipment can be merged in various ways, for instance into one single apparatus. The various entities may be involved in performing and/or controlling of one or more of the steps 1002 to 1012.

As illustrated by the step 1001, the UE is placed in a free space environment. Then, the UE may be scheduled, e.g. by the network entity/network emulator without any UL gap intervals (e.g. "No UL gap scheduled" in 1002), as indicated by step 1002 of sequence 1, or with one or more UL gap intervals (e.g. "UL Gap scheduled" in 1005), as indicated by step 1005 of sequence 2. Dependent upon whether the UE is scheduled without any UL gap intervals for its UL transmission(s), or if the UE is scheduled with one or more UL gap intervals for its UL transmissions, one may initiate sequence 1 or sequence 2 to be performed and/or controlled by the testing arrangement 100.

In step 1002, a respective network entity/network emulator may configure the UE without any UL gap intervals scheduled, and the UE may apply/activate the corresponding configuration.

According to step 1003 of sequence 1, a first peak EIRP measurement is performed e.g. by the measurement equipment, and results in a first peak EIRP value P_NoGap as measured. Such a first peak EIRP measurement may be performed for a respective polarization, if available, for instance a respective peak EIRP measurement may be done per polarization direction. Step 1003 may be performed and/or controlled by a measurement equipment.

In step 1004, the UE may generate a first UL transmit power report and may provide it to the network entity. This first UL transmit power report is then intercepted by the network analyzer/network sniffer or by the network entity/network emulator for extraction of a first UL transmit power reduction value P-MPR_NoGap or of a first current maximum UL transmit power value Pc,max_NoGap, and for further verification as illustrated by the arrow pointing from step 1004 of sequence 1 to the verification box with steps 1009 to 1012. Such a first UL transmit power report of step 1008 may be provided from the network entity to the verification after such a network entity may have been provided with the first UL transmit power report from the UE. The first UL transmit power report may be sent as a part of a Medium Access Control, MAC, Control Element, CE, signalling, and may for instance be a first Power Headroom Report, PHR.

According to step 1005, the UE is scheduled with one or more UL gap intervals for its UL transmissions. In step 1005, a respective network entity/network emulator may configure the UE with one or more UL gap intervals scheduled, and the UE may apply/activate the corresponding configuration.

In step 1006, a second peak EIRP measurement after (step 1007) one or more UL gap intervals, and optionally a third peak EIRP measurement during (step 1006) one or more respective UL gap intervals, are performed e.g. by the measurement equipment, and results in a second and third peak EIRP values P_AfterGaps and P_InGaps as measured. Such a second and third peak EIRP measurements may be performed for a respective polarization, if available. For instance a respective peak EIRP measurement may be done per polarization direction. Step 1006 and/or step 1007 may be performed and/or controlled by a measurement equipment.

Further, according to step 1008, the UE may provide a second UL transmit power report to the network entity. Such a second UL transmit power report of step 1008 may be provided from the network entity to the verification after such a network entity may have been provided with the respective report from the UE. The second UL transmit power report may be sent as a part of MAC CE, signalling, and may for instance be a second PHR. The second UL transmit power report is then intercepted by e.g. the network analyzer/network sniffer or by the network entity/network emulator for extraction of a second UL transmit power reduction value P-MPR_AfterGaps or of a second current maximum UL transmit power value Pc,max_AfterGaps, and for further verification as illustrated by the arrow pointing from step 1008 of sequence 2 to the verification steps 1009 to 1012.

For instance, after both sequences 1 and 2 are performed, one may have obtained (e.g. received) a respective first and second UL transmit power report. Also, a first measurement indicative of a first measured peak EIRP value P_NoGap and a second measurement indicative of a second measured peak EIRP value P_AfterGaps (the second measurement is performed outside the one or more scheduled UL gap intervals) are performed. Then, by the steps 1009 to 1012, for instance as automated on a general-purpose computer or as performed by a human operator, one may determine whether the UE is eligible for UL gap configuration at least based on the obtained first and second UL transmit power reports, and on the first and second measured peak EIRP values P_NoGap and P_AfterGaps of the respective measurement steps 1003, 1007, and optionally on a third measured peak EIRP value P_InGaps of the measurement step 1006.

In step 1009, one may verify if the value P_NoGap is >=a first threshold value. The first threshold value may correspond to an e.g. FCC measured value or an agreed value by standardization, to name but a few non-limiting examples.

In step 1010, one may verify if the value P_InGaps is <=a third threshold value. The third threshold value may correspond e.g. to a value of 0 dBm.

In step 1011, one may verify if the value P_AfterGaps minus the value P_NoGap is >=the value P-MPR_AfterGaps minus the value P-MPR_NoGap, or alternatively if the value P_AfterGaps minus the value P_NoGap is >=the value Pc,max_AfterGaps minus the value Pc,max_NoGap.

In step 1012, one may verify if the value P-MPR_AfterGaps minus the value P-MPR_NoGap is >=a second threshold, or alternatively if value Pc,max_AfterGaps minus the value Pc,max_NoGap>=the second threshold. The second threshold may correspond to a value of e.g. 5 to 6 dB, to name but one non-limiting example.

If the verifying of any of the steps 1009 to 1011, and optionally of step 1012 is passed, as indicated by box 1013, the UE is eligible for UL gap scheduling, and may be configured accordingly, for instance.

Steps 1003 to 1004 or a part of it of 'Sequence 1'; steps 1006 to 1008 or a part of it of 'Sequence 2'; and/or steps 1009 to 1012 of 'Verification' or a part of it, can be performed and/or controlled in any order.

Example embodiments according to all exemplary aspect, e.g. by a testing arrangement 100, may thus enable a test procedure for UE compliance tests to check whether a UE shows enough transmit power improvements when it is scheduled with one or more UL gap intervals, and further whether the UE is actively using the scheduled one or more UL gap intervals for (e.g. human body) proximity sensing by its radar antenna array (and not for PA or beam calibration, or any other purpose, to name but a few non-limiting examples).

Such a test procedure may not use any phantom and/or blocking material and may be based on both P-MPR reports (whereby the UE indicates the applied transmit power backoff value as belonging to a certain range), which may be a part of or comprised by the respective first and second UL transmit power reports, and may further be based on peak EIRP value measurements (defined as the total power radiated by a fictious isotropic antenna having the same power density as the maximum power density achievable over the main lobe of the antenna array). Such a test procedure may be performed with one or more UL gap intervals and without any UL gap intervals scheduled. UL gap intervals may be scheduled to allow the user equipment to suspend regular UL transmissions and re-use the antenna array for performing in-band or out-of-band proximity sensing.

For instance, in a first step of such a test procedure, no UL gap is scheduled (e.g. step 1002), and a first peak EIRP value P_NoGap is measured (e.g. step 1003), and a first P-MPR value P-MPR_NoGap as reported by the UE is obtained (e.g.

step 1004). In this first step, the UE may be unable to perform proximity sensing (as there are no UL gap intervals configured) and, further, may be unaware about the (e.g. human of the respective UE) body position, and thus is expected to apply some default transmit power backoff corresponding to some default transmit power, and further to some default peak EIRP value (=default transmit power+gain of the antenna array). This default peak EIRP may correspond to a worst-case scenario (i.e., the user's body or face touches the UE and is a few mm from the UE antenna array).

In a second step of such a test procedure, UL gap intervals are configured (e.g. step 1005), and a second peak EIRP value P_AfterGaps is measured (e.g. step 1006) during regular UL transmissions (PUCCH/PUSCH) and after proximity measurements have been performed during the UL gap intervals, and a second P-MPR value P-MPR_AfterGaps as reported by the UE is obtained (e.g. step 1008). The second step of such a test procedure is performed in a free-space environment so as the UE is expected to not apply any transmit power backoff. Some transmit power improvement are then expected both in terms of measured EIRP value and reported P-MPR value. This improvement may be expected to be above some thresholds T1 for the UL gap scheduling/configuration to be useful, for instance T1=5 or 6 dB as transmit power improvement may be targeted.

More specifically, it is checked whether the difference P_AfterGaps-P_NoGap is above the difference P-MPR_AfterGaps-P-MPR_NoGap (1) in order to check whether the P-MPR reports are not tricked by the respective UE, and whether P-MPR_AfterGaps-P-MPR_NoGap is above the threshold T1 (2) in order to check whether the expected transmit power improvements are met.

Also it is further checked whether the default peak EIRP value measured during the first step is not artificially low. Indeed, the respective UE may cheat and apply a too strong default transmit power backoff in the first step of such a test procedure to show the expected 5 or 6 dB improvement in the second step of such a test procedure. For this further check, P_NoGap value is compared either versus some FCC figures in terms of maximum peak EIRP allowed for this respective UE model to comply with the MPE limit, or versus some simulation figures based on a visual inspection of the antenna array (e.g., 2×2 vs 1×4 vs 1×8 antenna array) and corresponding near-field simulations for this type of antenna array.

More specifically, it is checked whether the measured peak EIRP P_NoGap is above some further threshold T2 (3), which may be specific to this user equipment model.

Optionally, some further peak EIRP value measurements P_InGaps may be performed to make sure that no PA calibration procedure or alike is taking place during the configured UL gap intervals.

More specifically, it is checked whether the measured EIRP P_InGaps is below some further threshold T3 (4), for instance 0 dBm.

If the three first checks (1), (2) and (3) are passed, then the UE is eligible for UL gap configuration and shows the expected transmit power improvements.

If the fourth check (4) is passed, then it is confirmed that the configured UL gap intervals are really used for proximity sensing and not for other invalid purposes.

Pc,max value in the P-MPR report, which is the current allowable UE maximum transmit power (including any transmit power backoff if any), may be used as an alternative to the P-MPR value provided it is or may be ensured that the user equipment transmit at nominal maximum transmit power in free-space environment (e.g., 23 dBm), and that no further transmit power backoff in addition to the MPE-related one is applied during the first and second steps (for instance because of overheating issues).

The above-disclosed test procedure of one or more example embodiments of all exemplary aspects may (e.g. only) schedule UL gap intervals for user equipment that can show a gain of at least 5 or 6 dB when using radar measurements for user detection during the gap intervals. When no user of the UE is detected within the proximity of the UE, the UE is not under MPE event and can increase the Tx power. For the UE's Tx power to reveal significant changes, the user equipment needs to be in power limited scenario. In a test mode, it may be possible to configure the UE for such operating condition.

Value 'P_NoGap' may verify the peak EIRP power under MPE events (PA power+antenna gain). This value may depend on the antenna design (i.e. array type).

Value 'P_InGaps' may verify that the UE is either not transmitting any power above in band requirement during the gap intervals (in case of out-of-band radar) or that it is transmitting below the maximum allowed power by gNB (in case of dynamic indication from gNB of maximum gap power for in-band radar). This step is used to check that the respective user equipment is not using the gap for internal calibrations e.g. PA and transceiver calibration to achieve the required gain (e.g. 6 dB gain).

Value 'P_AfterGaps' may verify the absolute maximum Tx radiated power by the user equipment without MPE events. The difference between 'P_NoGap' and 'P_AfterGaps' should show sufficient improvement (e.g. 5 or 6 dB) to justify scheduling gap intervals for this user equipment.

In order to be granted the UL gap intervals, the user equipment may show enough P-MPR improvement. Such improvement may depend on the absolute value of the allowed peak EIRP with and without the MPE event.

FCC allows the Power Density (PD) under MPE event of 0 dBm/cm2 (i.e. 1 mW/cm2). The allowed PD may be irrespective of the antenna array design. The associated Peak EIRP allowed to remain under the 0 dBm/cm2 PD value is dependent on the array design. Indeed, the maximum peak EIRP is dictated by the antenna gain (particularly the radiated efficiency of the antenna design) added to the maximum transmit power value of 23 dBm. The maximum allowed peak EIRP during an MPE event may be estimated with simulations and may depend on the antenna array design (i.e. 1×4 array; or 1×8 array). This may mean that depending on the array design, the PD that reaches the MPE evaluation area may differ. The lower the allowed absolute peak EIRP value under MPE event is, the larger the resulting relative P-MPR improvement is, therefore, the absolute Peak EIRP under MPE event needs to be checked in the test to avoid artificially increasing the P-MPR improvement during such a test procedure according to example embodiments of all exemplary aspects.

The goal of such a test procedure may be to prevent one or more UEs showing an artificially high gain in a respective UL transmit power report (e.g. P-MPR report) enhancements by setting the minimum value to a lower threshold than actually needed. The respective threshold can be verified by visual inspection of the array, the measured peak EIRP value and simulations of the power density for similar array type. As such, combining peak EIRP value measurements with P-MPR reporting in the procedure enables 3GPP to verify:

1. P-MPR reporting with and without UL gap intervals is correct given the array design e.g. 1×4 array or 2×2 array, to name but a few non-limiting examples;
2. P-MPR improvement reporting is matching the peak EIRP reporting.

In the following, a numerical example for one or more of the aforementioned aspects is given:

FCC defines the evaluation area as 2×2 $cm^2$ for power density calculation. The energy collected in such an evaluation area will depend on the array design, i.e. a 1×4 array at 28 GHz is physically larger than the evaluation area, while a 2×2 array at 28 GHz fills up the entire evaluation area.

A 2×4 linear array or a 2×2 square array will not spread the energy in the same way in the near field nor in the far field. As such the maximum allowed EIRP will not be the same value for a respective antenna array type. Accurately estimating/simulating this value may enable verifying that P-MPR set by the user equipment is optimum for its design type. For instance, the value may be linked to FCC test, and/or it may be agreed on allowed peak EIRP value allowed under MPE event for a given antenna type (i.e. 1×4 array vs 1×8 array). Indeed, this may discard cheating the radio frequency (RF) requirement test by setting a P-MPR larger than needed, since the needed value can be estimated by visual inspecting the type of array design.

Furthermore, for the maximum allowed peak EIRP to comply with FCC limit of 0 dBm/$cm^2$ (at 20% UL duty cycle, to represent the common slot configuration of DDDSU) for a 1×4 linear array, 2×2 square array and a 1×8 linear array, there may be at least 3 dB difference due to the array design (1×4 vs 1×8), due to the power spreading in the MPE evaluation area (i.e. 2×2 $cm^2$). As such P-MPR enhancements may be larger for a 1×4 array design than for a 1×8 array design. This can be verified by the determining whether the user equipment is eligible for UL gap configuration, e.g. as described above with regard to steps 1009 to 1011, and optionally in addition step 1012.

For a 1×4 linear array, the FCC limit for maximum allowed EIRP value during a MPE event, may be expected to be around 25 dBm for 20% UL scheduling. Therefore, such a user equipment may be able to transmit at least with 31 dBm when UL gap intervals are scheduled and no MPE event is detected in order to show a 6 dB improvement.

For a 1×8 linear array, the FCC limit for maximum allowed EIRP during a MPE event, may be expected to be around 31 dBm for 20% UL scheduling. Therefore, such a user equipment may be able to transmit at least with 37 dBm when UL gap intervals are scheduled and no MPE event is detected in order to show a 6 dB improvement.

It is noted that these values are exemplary and may change, e.g. depending on a simulation and design parameters.

P-MPR improvement may depend on the array design (e.g. 1×4 linear array or 1×8 linear array) hence the user equipment may artificially report larger P-MPR than needed if the value is not checked. The FCC limit for maximum allowed EIRP during an MPE event, may thus be expected to be around 20 dBm in 20% UL scheduling.

If the user equipment can transmit at 26 dBm EIRP (Hand-held UEs are Power Class 3 devices (PC3) as defined in 3GPP TR 38.817-01 requires at least 22.4 dBm transmit power), this user equipment UE needs to apply 6 dB P-MPR (=26 dBm−20 dBm)

As such, for UL gap intervals to be granted, absolute peak EIRP value without MPE events may be needed to be at least a threshold e.g. 26 dBm and P-MPR improvement needs to be at least e.g. 6 dB.

To show a relative improvement of 6 dB that is meaningful, the UE maximum Tx radiated power may be linked under MPE (i.e. value 'P_NoGap') to a FCC test in near-field, and/or standardization may agree on a minimum value e.g. at least 20 dBm with 20% UL duty cycle for a 1×4 array, to name but a few non-limiting examples. An example of values to be agreed to at least show as maximum allowed radiated power without gap intervals are disclosed in the above summary section of this specification.

Figure 2:
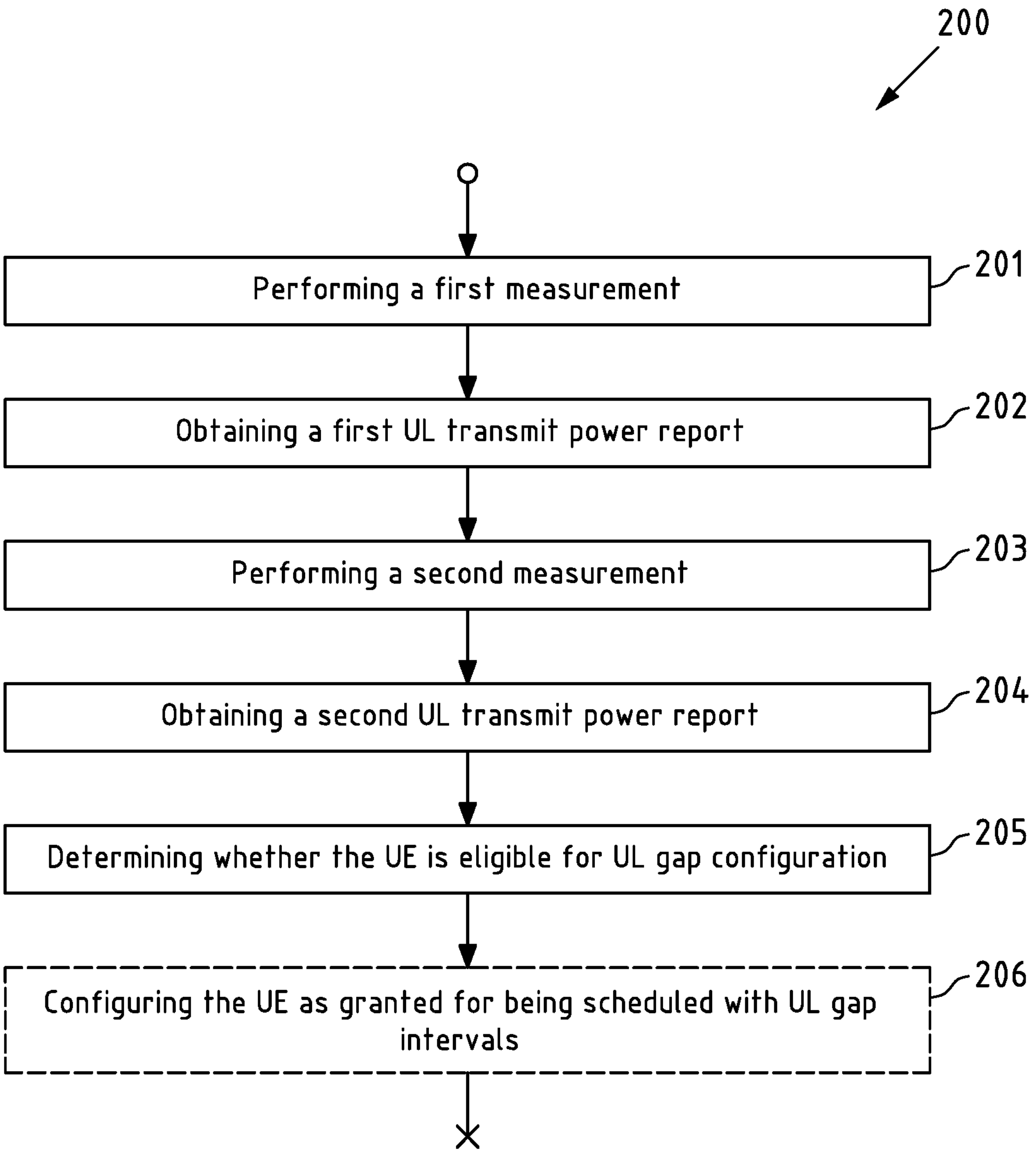
FIG. 2 a flowchart showing an example embodiment of a method according to the first exemplary aspect.

FIG. 2 is a flowchart 200 showing an example embodiment of a method according to the first exemplary aspect. This flowchart 200 may for instance be performed by a testing arrangement, e.g. the testing arrangement 100 of FIG. 1.

In a first step 201, a first measurement indicative of a first peak EIRP value while a respective UE is scheduled without any UL gap intervals is performed.

A configuration indicative of being scheduled without any UL gap intervals for UL transmission(s) of the respective UE may be provided to the respective UE, e.g. by signalling it to the respective UE. Then, the configuration may be activated, and the first measurement is performed. Further a first UL transmit power report may be generated by the respective UE, and then provided by the respective UE, e.g. by sending the first UL transmit power report.

In a second step 202, a first UL transmit power report is obtained, e.g. by receiving the report from a UE.

In a third step 203, a second measurement indicative of a second peak EIRP value while a respective UE is scheduled with one or more UL gap intervals is performed.

A configuration indicative of being scheduled with one or more UL gap intervals for UL transmission(s) of the respective UE may be provided to the respective UE, e.g. by signalling it to the respective UE. Then, the configuration may be activated, and the second measurement is performed. Further a second UL transmit power report may be generated by the respective UE, and then provided by the respective UE, e.g. by sending the second UL transmit power report.

In a fourth step 204, a second UL transmit power report is obtained, e.g. by receiving the report from the UE that e.g. also provided the first UL transmit power report in step 202.

In a fifth step 205, it is determined, based on the results of step 201 to 204 whether the UE is eligible for UL gap configuration or not. For instance, the functional features shown in the FIG. 1 at least a part of the steps 1009 to 1012 may be performed and/or controlled for the determining. Steps 1009 to 1012 may represent different verifying steps that can be performed and/or controlled as disclosed above with regard to FIG. 1 and/or in the summary section of this specification, and in any random order.

In case the respective UE is determined to be eligible for UL gap configuration, in an optional sixth step 206, the respective UE is configured for being scheduled with one or more gap intervals for its UL transmission(s).

Figure 3:
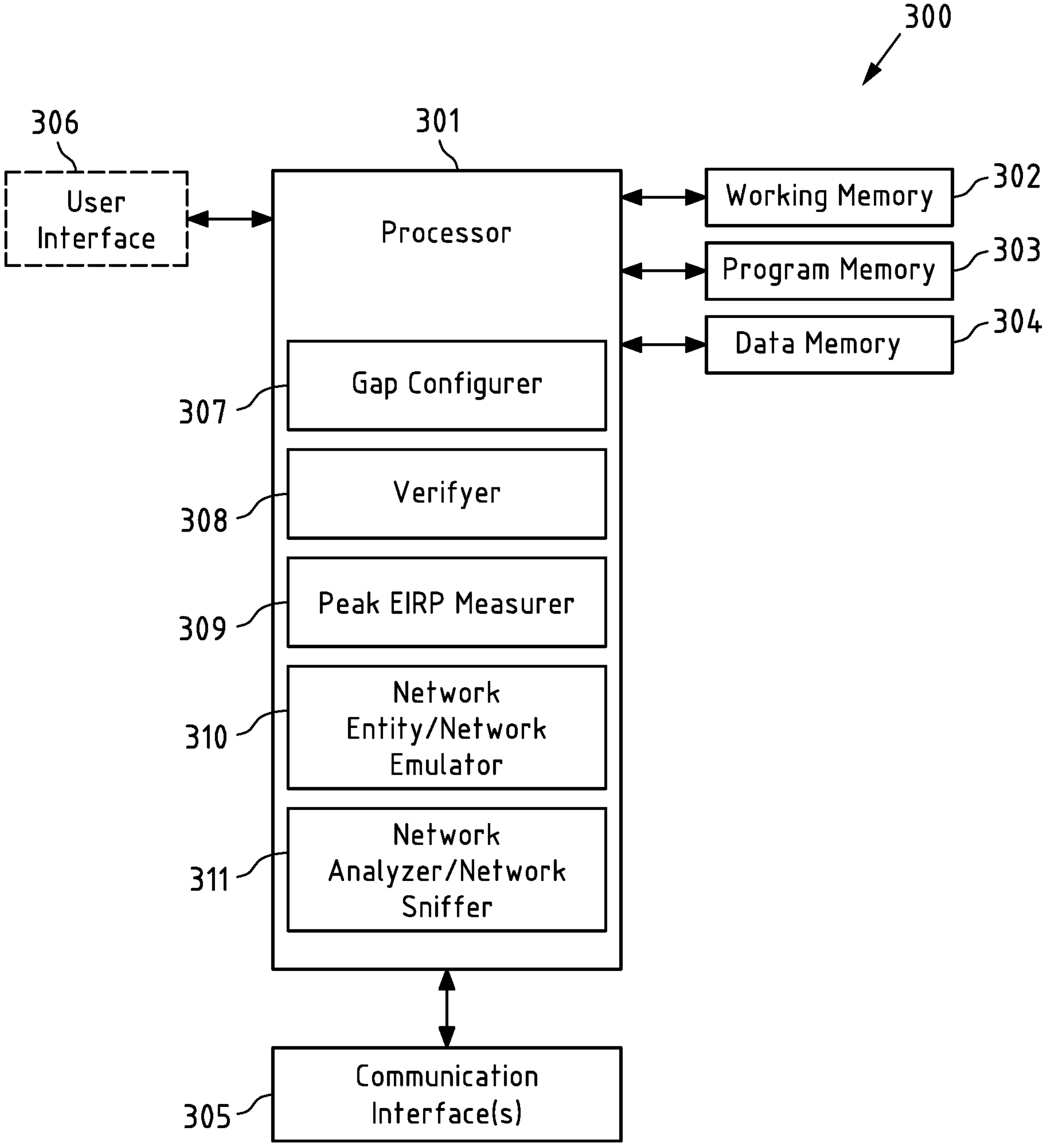
FIG. 3 a schematic block diagram of an entity of a testing arrangement according to the second exemplary aspect.

FIG. 3 is a schematic block diagram of an apparatus 300 according to an exemplary aspect, which may for instance be a part of the testing arrangement 100 of FIG. 1.

Apparatus 300 comprises a processor 301, working memory 302, program memory 303, data memory 304, communication interface(s) 305, and an optional user interface 306.

Apparatus 300 may for instance be configured to perform and/or control or comprise respective means (at least one of 301 to 306) for performing and/or controlling the method according to the first exemplary aspect. Apparatus 300 may as well constitute an apparatus comprising at least one processor (301) and at least one memory (302) including computer program code, the at least one memory and the computer program code configured to, with the at least one processor, cause an apparatus, e.g. apparatus 300 at least to perform and/or control the method according to first exemplary aspect.

Processor 301 may for instance comprise a gap configurer 307 as a functional and/or structural unit. The gap configurer 307 may for instance be configured to configure a UE without any UL gap intervals and/or with one or more UL gap intervals for UL transmissions of a UE (see step 204 of FIG. 2).

Processor 301 may for instance comprise a verifyer 308 as a functional and/or structural unit. The verifyer 308 may for instance be configured to perform and/or control one or more verifying steps (see steps 1009 to 1012, or a combination thereof of FIG. 1).

Processor 301 may for instance comprise a peak EIRP measurer 309 as a functional and/or structural unit. The peak EIRP measurer 309 may for instance be configured to perform and/or control one or more measurements (see steps 1003, 1006, 1007 of FIG. 1).

Processor 301 may for instance comprise a network entity/network emulator 310 as a functional and/or structural unit. The network entity/network emulator 310 may for instance be configured to perform and/or control to emulate a respective network entity configured to perform and/or control the method, or a part of it, of the first exemplary. Such a network entity/network emulator 310 may represent a base station emulator, a gNB emulator and/or an eNB emulator e.g. of the testing arrangement of FIG. 1, to name but a few non-limiting examples.

Processor 301 may for instance comprise a network analyzer/network sniffer 311 as a functional and/or structural unit. The network analyzer/network sniffer 311 may for instance be configured to perform and/or control to analyze certain aspects of a network, in particular be configured to perform and/or control the method, or a part of it, of the first exemplary, as far as applicable.

Processor 301 may for instance further control the memories 302 to 304, the communication interface(s) 305, and the optional user interface 306.

Processor 301 may for instance execute computer program code stored in program memory 303, which may for instance represent a computer readable storage medium comprising program code that, when executed by processor 301, causes the processor 301 to perform the method according to the first exemplary aspect.

Processor 301 (and also any other processor mentioned in this specification) may be a processor of any suitable type. Processor 301 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 301 may for instance be an application processor that runs an operating system.

Program memory 303 may also be included into processor 301. This memory may for instance be fixedly connected to processor 301, or be at least partially removable from processor 301, for instance in the form of a memory card or stick. Program memory 303 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 303 may also comprise an operating system for processor 301. Program memory 303 may also comprise a firmware for apparatus 300.

Apparatus 300 comprises a working memory 302, for instance in the form of a volatile memory. It may for instance be a Random Access Memory (RAM) or Dynamic RAM (DRAM), to give but a few non-limiting examples. It may for instance be used by processor 301 when executing an operating system and/or computer program.

Data memory 304 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 304 may for instance store one or more first UL transmit power reports, one or more second UL transmit power reports, one or more first peak EIRP values, one or more second peak EIRP values, one or more third measured in-band peak EIRP value, one or more first threshold values, one or more second threshold values, one or more third threshold values, one or more configurations for configuring one or more UEs for being scheduled without any UL gap intervals and/or with one or more UL gap intervals for their respective UL transmissions, or a combination thereof.

Communication interface(s) 306 enable apparatus 300 to communicate with other entities, e.g. with one or more entities of the testing arrangement. The communication interface(s) 450 may for instance comprise a wireless interface, e.g. a cellular radio communication interface and/or a WLAN interface) and/or wire-bound interface, e.g. an IP-based interface, for instance to communicate with entities via the Internet.

User interface 306 is optional and may comprise a display for displaying information to a user and/or an input device (e.g. a keyboard, keypad, touchpad, mouse, etc.) for receiving information from a user.

Some or all of the components of the apparatus 300 may for instance be connected via a bus. Some or all of the components of the apparatus 300 may for instance be combined into one or more modules.

The following embodiments shall also be considered to be disclosed:

Embodiment 1

A testing arrangement, comprising at least one processor and at least one memory including computer program code, the at least one memory and the computer program code configured to, with the at least one processor, cause the testing arrangement at least to perform and/or control: while the UE is scheduled without uplink, UL, gap intervals for proximity sensing:

performing a first measurement indicative of a first measured peak effective isotropic radiated power, EIRP, value of the UE, and obtaining a first UL transmit power report from the UE;

while the UE is scheduled with one or more UL gap intervals for proximity sensing and is placed in a free-space environment:

outside the one or more UL gap intervals, performing a second measurement indicative of a second measured peak EIRP value of the UE, and obtaining a second UL transmit power report from the UE; and determining whether the UE is eligible for UL gap configuration at least based on the first and second measured peak EIRP values and on the first and second UL transmit power reports.

Embodiment 2

The testing arrangement of embodiment 1, wherein the first and second UL transmit power reports comprise first and second UL transmit power reduction values respectively.

Embodiment 3

The testing arrangement of embodiment 1, wherein the first and second UL transmit power reports comprise first and second current maximum UL transmit power values respectively.

Embodiment 4

The testing arrangement of embodiment 2, the at least one memory and the computer program code configured to, with the at least one processor, cause the testing arrangement further to perform:

verifying that the first measured peak EIRP value is equal to or larger than a first threshold value;

verifying that a difference between the first and second measured peak EIRP values is consistent with a difference between the first and second UL transmit power reduction values; and verifying that a difference between the first and second UL transmit power reduction values is equal to or larger than a second threshold value.

Embodiment 5

The testing arrangement of embodiment 2, the at least one memory and the computer program code configured to, with the at least one processor, cause the testing arrangement further to perform:

verifying that the first measured peak EIRP value is equal to or larger than a first threshold value;

verifying that a difference between the first and second measured peak EIRP values is consistent with a difference between the first and second UL transmit power reduction values; and verifying that a difference between the first and second measured peak EIRP values is equal to or larger than a second threshold value.

Embodiment 6

The testing arrangement of embodiment 3, the at least one memory and the computer program code configured to, with the at least one processor, cause the testing arrangement further to perform:

verifying that the first measured peak EIRP value is equal to or larger than a first threshold value;

verifying that a difference between the first and second measured peak EIRP values is consistent with a difference between the first and second current maximum UL transmit power values; and verifying that a difference between the first and second current maximum UL transmit power values is equal to or larger than a second threshold value.

Embodiment 7

The testing arrangement of embodiment 3, the at least one memory and the computer program code configured to, with the at least one processor, cause the testing arrangement further to perform:

verifying that the first measured peak EIRP value is equal to or larger than a first threshold value;

verifying that a difference between the first and second measured peak EIRP values is consistent with a difference between the first and second current maximum UL transmit power values; and verifying that a difference between the first and second measured peak EIRP values is equal to or larger than a second threshold value.

Embodiment 8

The testing arrangement of any of the embodiments 4 to 7, wherein the first threshold value is specific to a particular antenna array type used by the UE.

Embodiment 9

The testing arrangement of embodiment 8, wherein the first threshold value is determined from near-field simulations for the particular antenna array type.

Embodiment 10

The testing arrangement of any of the embodiments 4 to 7, wherein the first threshold value is determined from near-field measurements or simulations.

Embodiment 11

The testing arrangement of any of the preceding embodiments, while the UE is scheduled with the one or more UL gap intervals for proximity sensing and is placed in the free-space environment, the at least one memory and the computer program code configured to, with the at least one processor, cause the testing arrangement further to perform:

during one or more UL gap intervals, performing a third measurement indicative of a third measured in-band peak EIRP value of the UE; and verifying that the third measured in-band peak EIRP value is smaller than or equal to a third threshold value.

Embodiment 12

The testing arrangement of any of the embodiments 1 to 11, comprising a plurality of entities, wherein the at least one memory and the computer program code that are configured to, with the at least one processor, cause the testing arrangement further to perform any of the embodiments 1 to 11 are comprised by or are a part of the plurality of entities.

Embodiment 13

A tangible computer-readable medium storing computer program code, the computer program code when executed by a processor causing a testing arrangement to perform and/or control:

while a user equipment, UE, is scheduled without uplink, UL, gap intervals for proximity sensing:

performing a first measurement indicative of a first measured peak effective isotropic radiated power, EIRP, value of the UE, and obtaining a first UL transmit power report from the UE;

while the UE is scheduled with one or more UL gap intervals for proximity sensing and is placed in a free-space environment:

outside the one or more scheduled UL gap intervals, performing a second measurement indicative of a second measured peak EIRP value of the UE, and obtaining a second UL transmit power report from the UE; and determining whether the UE is eligible for UL gap configuration at least based on the first and second measured peak EIRP values and on the first and second UL transmit power reports.

Embodiment 14

The tangible computer-readable medium of embodiment 13, wherein the first and second UL transmit power reports comprise first and second UL transmit power reduction values respectively.

Embodiment 15

The tangible computer-readable medium of embodiment 13, wherein the first and second UL transmit power reports comprise first and second current maximum UL transmit power values respectively.

Embodiment 16

The tangible computer-readable medium of embodiment 14, the computer program code when executed by a processor causing the testing arrangement further to perform and/or control:

verifying that the first measured peak EIRP value is equal to or larger than a first threshold value;

verifying that a difference between the first and second measured peak EIRP values is consistent with a difference between the first and second UL transmit power reduction values; and verifying that a difference between the first and second UL transmit power reduction values is equal to or larger than a second threshold value.

Embodiment 17

The tangible computer-readable medium of embodiment 14, the computer program code when executed by a processor causing the testing arrangement further to perform and/or control:

verifying that the first measured peak EIRP value is equal to or larger than a first threshold value;

verifying that a difference between the first and second measured peak EIRP values is consistent with a difference between the first and second UL transmit power reduction values; and verifying that a difference between the first and second measured peak EIRP values is equal to or larger than a second threshold value.

Embodiment 18

The tangible computer-readable medium of embodiment 15, the computer program code when executed by a processor causing the testing arrangement further to perform and/or control:

verifying that the first measured peak EIRP value is equal to or larger than a first threshold value;

verifying that a difference between the first and second measured peak EIRP values is consistent with a difference between the first and second current maximum UL transmit power values; and verifying that a difference between the first and second current maximum UL transmit power values is equal to or larger than a second threshold value.

Embodiment 19

The tangible computer-readable medium of embodiment 15, the computer program code when executed by a processor causing the testing arrangement further to perform and/or control:

verifying that the first measured peak EIRP value is equal to or larger than a first threshold value;

verifying that a difference between the first and second measured peak EIRP values is consistent with a difference between the first and second current maximum UL transmit power values; and verifying that a difference between the first and second measured peak EIRP values is equal to or larger than a second threshold value.

Embodiment 20

The tangible computer-readable medium of any of the embodiments 16 to 19, wherein the first threshold value is specific to a particular antenna array type used by the UE.

Embodiment 21

The tangible computer-readable medium of embodiment 20, wherein the first threshold value is determined from near-field simulations for the particular antenna array type.

Embodiment 22

The tangible computer-readable medium of any of the embodiments 16 to 19, wherein the first threshold value is determined from near-field measurements or simulations.

Embodiment 23

The tangible computer-readable medium of any of the embodiments 13 to 22, while the UE is scheduled with the one or more UL gap intervals for proximity sensing and is placed in the free-space environment, the computer program code when executed by a processor causing the testing arrangement further to perform and/or control:

during one or more UL gap intervals, performing a third measurement indicative of a third measured in-band peak EIRP value of the UE; and verifying that the third measured in-band peak EIRP value is smaller than or equal to a third threshold value.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

The invention claimed is:

1. A method for testing a user equipment (UE), comprising:

while the UE is scheduled without uplink (UL) gap intervals for proximity sensing:

performing a first measurement indicative of a first measured peak effective isotropic radiated power (EIRP) value of the UE, and obtaining a first UL transmit power report from the UE;

while the UE is scheduled with one or more UL gap intervals for proximity sensing and is placed in a free-space environment:

outside the one or more UL gap intervals, performing a second measurement indicative of a second measured peak EIRP value of the UE, and obtaining a second UL transmit power report from the UE; and determining whether the UE is eligible for UL gap configuration at least based on the first and second measured peak EIRP values and on the first and second UL transmit power reports.

2. The method of claim 1, wherein the first and second UL transmit power reports comprise first and second UL transmit power reduction values respectively.

3. The method of claim 2, further comprising:

verifying that the first measured peak EIRP value is equal to or larger than a first threshold value;

verifying that a difference between the first and second measured peak EIRP values is consistent with a difference between the first and second UL transmit power reduction values; and verifying that a difference between the first and second UL transmit power reduction values is equal to or larger than a second threshold value.

4. The method of claim 3, wherein the first threshold value is specific to a particular antenna array type used by the UE.

5. The method of claim 3, wherein the first threshold value is determined from near-field simulations for the particular antenna array type.

6. The method of claim 3, wherein the first threshold value is determined from near-field measurements or simulations.

7. The method of claim 2, further comprising:

verifying that the first measured peak EIRP value is equal to or larger than a first threshold value;

verifying that a difference between the first and second measured peak EIRP values is consistent with a difference between the first and second UL transmit power reduction values; and verifying that a difference between the first and second measured peak EIRP values is equal to or larger than a second threshold value.

8. The method of claim 1, wherein the first and second UL transmit power reports comprise first and second current maximum UL transmit power values respectively.

9. The method of claim 8, further comprising:

verifying that the first measured peak EIRP value is equal to or larger than a first threshold value;

verifying that a difference between the first and second measured peak EIRP values is consistent with a difference between the first and second current maximum UL transmit power values; and verifying that a difference between the first and second current maximum UL transmit power values is equal to or larger than a second threshold value.

10. The method of claim 8, further comprising:

verifying that the first measured peak EIRP value is equal to or larger than a first threshold value;

verifying that a difference between the first and second measured peak EIRP values is consistent with a difference between the first and second current maximum UL transmit power values; and verifying that a difference between the first and second measured peak EIRP values is equal to or larger than a second threshold value.

11. The method of claim 1, further comprising:

while the UE is scheduled with the one or more UL gap intervals for proximity sensing and is placed in the free-space environment:

during one or more UL gap intervals, performing a third measurement indicative of a third measured in-band peak EIRP value of the UE; and verifying that the third measured in-band peak EIRP value is smaller than or equal to a third threshold value.

12. A testing arrangement comprising at least one processor, and at least one memory storing computer program code that, when executed by the at least one processor, cause the testing arrangement to:

while a user equipment (UE) is scheduled without uplink (UL) gap intervals for proximity sensing:

perform a first measurement indicative of a first measured peak effective isotropic radiated power (EIRP) value of the UE, and obtain a first UL transmit power report from the UE;

while the UE is scheduled with one or more UL gap intervals for proximity sensing and is placed in a free-space environment:

outside the one or more UL gap intervals, perform a second measurement indicative of a second measured peak EIRP value of the UE, and obtain a second UL transmit power report from the UE; and determine whether the UE is eligible for UL gap configuration at least based on the first and second measured peak EIRP values and on the first and second UL transmit power reports.

13. The testing arrangement of claim 12, wherein the first and second UL transmit power reports comprise first and second UL transmit power reduction values respectively.

14. The testing arrangement of claim 13, wherein the testing arrangement is further caused to:

verify that the first measured peak EIRP value is equal to or larger than a first threshold value;

verify that a difference between the first and second measured peak EIRP values is consistent with a difference between the first and second UL transmit power reduction values; and verify that a difference between the first and second UL transmit power reduction values is equal to or larger than a second threshold value.

15. The testing arrangement of claim 13, wherein the testing arrangement is further caused to:

verify that the first measured peak EIRP value is equal to or larger than a first threshold value;

verify that a difference between the first and second measured peak EIRP values is consistent with a difference between the first and second UL transmit power reduction values; and verify that a difference between the first and second measured peak EIRP values is equal to or larger than a second threshold value.

16. The testing arrangement of claim 12, wherein the first and second UL transmit power reports comprise first and second current maximum UL transmit power values respectively.

17. The testing arrangement of claim 16, wherein the testing arrangement is further caused to:

verify that the first measured peak EIRP value is equal to or larger than a first threshold value;

verify that a difference between the first and second measured peak EIRP values is consistent with a difference between the first and second current maximum UL transmit power values; and verify that a difference between the first and second current maximum UL transmit power values is equal to or larger than a second threshold value.

18. The testing arrangement of claim 16, wherein the testing arrangement is further caused to:

verify that the first measured peak EIRP value is equal to or larger than a first threshold value;

verify that a difference between the first and second measured peak EIRP values is consistent with a difference between the first and second current maximum UL transmit power values; and verify that a difference between the first and second measured peak EIRP values is equal to or larger than a second threshold value.

19. A non-transitory computer-readable storage medium storing computer program code, the computer program code when executed by a processor causing a testing arrangement to:

while a user equipment (UE) is scheduled without uplink (UL) gap intervals for proximity sensing:

perform a first measurement indicative of a first measured peak effective isotropic radiated power (EIRP) value of the UE, and obtain a first UL transmit power report from the UE;

while the UE is scheduled with one or more UL gap intervals for proximity sensing and is placed in a free-space environment:

outside the one or more UL gap intervals, perform a second measurement indicative of a second measured peak EIRP value of the UE, and obtain a second UL transmit power report from the UE; and determine whether the UE is eligible for UL gap configuration at least based on the first and second measured peak EIRP values and on the first and second UL transmit power reports.

20. The non-transitory computer-readable storage medium of claim 19, wherein the first and second UL transmit power reports comprise first and second UL transmit power reduction values respectively.

* * * * *